US010493888B2

(12) United States Patent
Hoffmann

(10) Patent No.: US 10,493,888 B2
(45) Date of Patent: Dec. 3, 2019

(54) HEADREST

(71) Applicant: GRAMMER AG, Amberg (DE)

(72) Inventor: Markus Hoffmann, Kuemmersbruck (DE)

(73) Assignee: GRAMMER AG, Amberg (DE)

( * ) Notice: Subject to any disclaimer, the term of this patent is extended or adjusted under 35 U.S.C. 154(b) by 95 days.

(21) Appl. No.: 15/046,521

(22) Filed: Feb. 18, 2016

(65) Prior Publication Data

US 2016/0243965 A1    Aug. 25, 2016

(30) Foreign Application Priority Data

Feb. 20, 2015  (DE) .......... 10 2015 001 995
May 19, 2015   (DE) .......... 10 2015 006 340
Sep. 8, 2015   (DE) .......... 10 2015 011 477

(51) Int. Cl.
| | |
|---|---|
| *B60N 2/818* | (2018.01) |
| *B60N 2/815* | (2018.01) |
| *B60N 2/894* | (2018.01) |

(52) U.S. Cl.
CPC .......... *B60N 2/818* (2018.02); *B60N 2/815* (2018.02); *B60N 2/894* (2018.02)

(58) Field of Classification Search
CPC .... B60N 2/4817; B60N 2/4814; B60N 2/818; B60N 2/815
See application file for complete search history.

(56) References Cited

U.S. PATENT DOCUMENTS

| | | | | |
|---|---|---|---|---|
| 3,563,602 A | * | 2/1971 | Ohta ............... | B60N 2/4817 |
| | | | | 297/410 |
| 5,895,094 A | * | 4/1999 | Mori ............... | B60N 2/4814 |
| | | | | 297/391 |
| 7,316,455 B2 | * | 1/2008 | Metz ............... | B60N 2/4814 |
| | | | | 297/410 |
| 7,562,936 B1 | * | 7/2009 | Veine .............. | B60N 2/4814 |
| | | | | 297/410 |
| 8,657,380 B2 | | 2/2014 | Fey et al. | |
| 9,403,458 B2 | | 8/2016 | Jeong | |
| 2012/0223563 A1 | * | 9/2012 | Zimmermann ........ | B60N 2/682 |
| | | | | 297/391 |
| 2014/0182404 A1 | * | 7/2014 | Jeong ............. | B60N 2/4814 |
| | | | | 74/89.23 |
| 2014/0327288 A1 | * | 11/2014 | Groenninger ........ | B60N 2/4805 |
| | | | | 297/410 |

FOREIGN PATENT DOCUMENTS

JP    2009-125398 A    6/2009

* cited by examiner

*Primary Examiner* — David R Dunn
*Assistant Examiner* — Tania Abraham
(74) *Attorney, Agent, or Firm* — Andrew Wilford

(57) ABSTRACT

The invention relates to a headrest for a seat, in particular for a vehicle seat, having a base (11) mounted on at least one support post (12a, 12b) on the seat and displaceable relative to the support post, having a latch (16) moveable between a locking position and a release position and capable of locking the base in at least one position relative to the support post, the latch comprising first holding means (46) on the base (11) and second holding means (47) on the support post (12a, 12b), the first holding means being formed on a slide (19) moveably mounted on the base (11) such that the first holding means and the second holding means are in engagement in the locking position and are in disengagement in the release position.

14 Claims, 11 Drawing Sheets

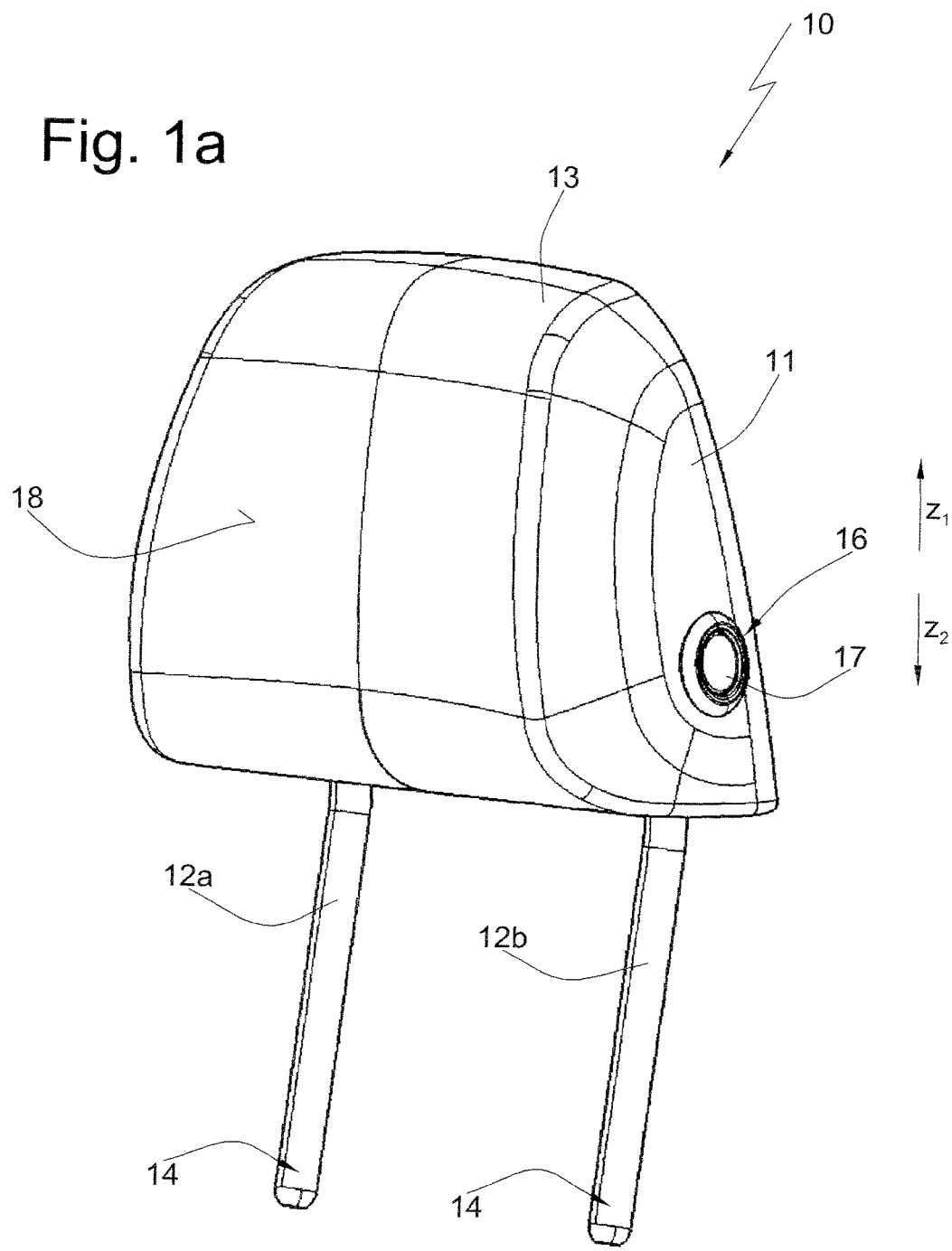

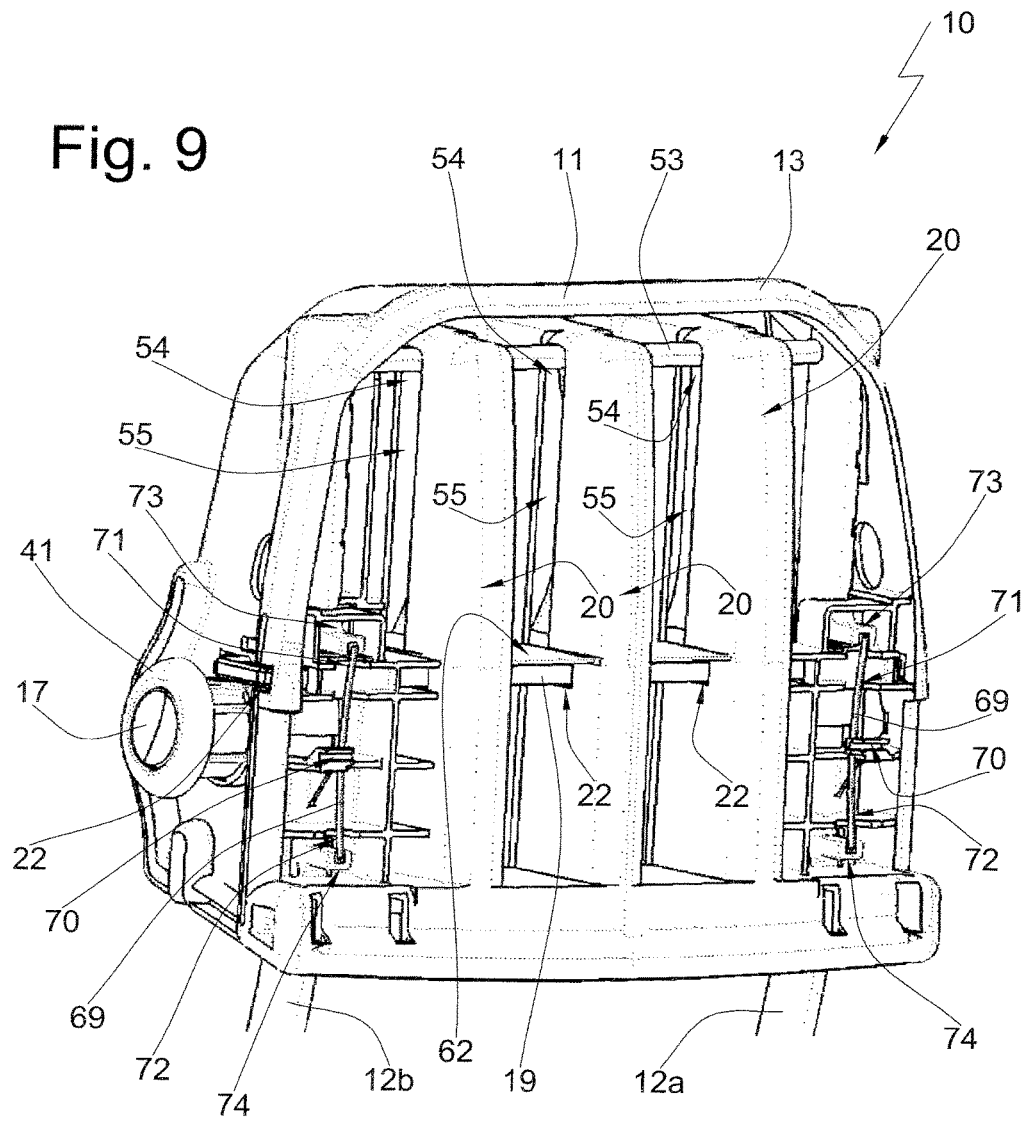

HEADREST

CROSS-REFERENCE TO RELATED APPLICATION

This application claims the priorities of German patent applications 102015001995.3 filed 20 Feb. 2015, 102015006340.5 filed 19 May 2015, and 102015011477.8 filed 8 Sep. 2015.

FIELD OF THE INVENTION

The present invention relates to a headrest for a seat, in particular for a vehicle seat.

BACKGROUND OF THE INVENTION

The headrest comprises at least one support post and a base on which a head contact surface is directly or indirectly mounted. The base is mounted on a seat by the support post, the support post being held in place by a fixed bearing and the base is mounted on the support post. The base is vertically adjustable relative to the support post. According to the present invention, vertically adjustable means that the positioning movement has vertical elements. The motion does not mandatorily have to be purely vertical.

A latch can lock the headrest at different height positions in at least one direction. For this purpose, a slide guided on the base is provided with first holding means. The first holding means act together with second holding means on the support post. If the latch is in a locking position, the first and the second holding means are engaged with each other. If the latch is in a release position, the first and the second holding means are disengaged from each other.

Such a headrest is known from the known prior use.

OBJECT OF THE INVENTION

It is the object of the present invention to provide a headrest in which manufacturing complexity is reduced. Moreover, it is the object of the present invention to provide a headrest that does not cause bothersome noises. In addition, it is the object of the present invention to provide a headrest having a latch for which large tolerances can be chosen.

SUMMARY OF THE INVENTION

The object of the present invention is achieved by the headrest in which the base is adjustably mounted on the support post so that it is movable into different height positions. A latch can lock the base in at least one position relative to the support post. First holding means of the latch are formed on a slide that is part of the locking mechanism. According to the present invention, "formed on a slide" means that the first holding means can be integrally formed with the slide or for example be attached to the slide. The slide is movably mounted on the base between a locking position and a release position. In the locking position, movement of the base is prevented in at least one adjustment direction while, while, in the release position, the base is movable. In the locking position for example upward movement of the base can be possible and downward movement can be prevented.

The slide for example forms together with the base and/or the support post a guide and mount with respect to at least one spatial direction. For example, the slide forms at least one first guide surface acting together with at least one second guide surface of the base or of the support post. For example, the base forms at least one guide surface for at least one guide surface of the slide that borders a guide groove for the slide formed on the base. The guide surfaces of the slide and of the base acting together can prevent movement of the slide in at least one direction and enable movement of the slide in at least one spatial direction. The slide can for example be slidably mounted in the guide groove and, in this manner, can be movably mounted between the locking position and the release position.

Moreover, the slide can for example have at least one guide surface that is in contact with at least one guide surface of the support post. The slide engages around the support post, for example at least partially, and at least one guide surface of the slide is in contact with the surface of the support post. The support post engages through for example a hole, in particular a slot, of the slide. The hole or the slot can for example form guide surfaces that are in contact with the surface of the support post. An edge of the slot is for example in contact with the support post. For example, the slot can allow movement of the slide in a first direction and prevent a movement in a second direction. For example, two opposite guide surfaces of the slot engage the support post and prevent movement in a second direction.

The guide surfaces are, at least in areas, formed for example by ribs or contact points. Alternatively or additionally for example at least one area of the guide surface can be configured such that it abuts in large areas against the slide.

The guide forms for example between the slide and the base and/or between the slide and the support post a tight fit. For example, the support post is oversized relative to the opposite lying guide surface of the slot of the slide so that the guide surfaces abut against the support post. For example, the slide is oversized relative to the guide of the base.

At least one of the guide surfaces of the base and/or of the slide is for example elastic and can be elastically deformed when making the tight fit.

The first or the second guide surface is for example at least partially part of a web that is elastically deformable into an adjacently formed deflection space. When guided between the slide and the base and/or between the slide and the support post, the web can elastically deform. For example, the web can form an edge of the hole. The deflection space can also be formed by a cavity. In this manner, the slide is guided free of play on the support post and/or the base at least with regard to one spatial direction.

In doing so for example a tight fit can be chosen and deviations in shape and position owing to manufacturing tolerances can be compensated out in this manner so that the slide is free of play at least with regard to one direction of movement.

One of the interengaging guide surfaces can form a bump that is in contact with the other guide surface. For example, bumps can project into a guide groove or a guide rail of the base from a plurality of sides or in different spatial directions so that the slide is guided free of play in a plurality of spatial directions.

For example, the web has at least one bump that is facing the respective other guide surface. In this case, the bump is in contact with the other guide surface.

According to one embodiment, the base has a guide groove. The guide groove forms a guide rail for the slide, on which the slide is movable between the locking position and the release position. The guide groove is for example molded in the base. For example, the slide is movable in a straight line like a drawer in the guide groove. For assembly, the slide can be simply inserted into the guide groove.

In principle, the slide can be mounted on the base such that forces from the base are transferrable to the slide at least in one spatial direction for example in spatial direction z. These forces then can be transferred from the slide to the support post. For example, the slide is mounted on the base in a movable manner in a first spatial direction and not movable in a second and third spatial direction. Forces in the second and third direction then can be transferred from the base to the slide.

The headrest has for example an actuating element. According to the present invention, the actuating element is any actuator by means of which the user can move the latch between the locking position and the release position from the outside. For example, the actuating element can be formed by a push button.

The actuating element of the latch is pivoted for example by a joint on the slide. The joint has for example a first joint member on the actuating element and a second joint member on the slide. The first joint member and the second joint member are for example interlockable and then form a positive connection. One joint member can for example be formed by a claw, in which the other joint member formed as a cylinder or a hollow cylinder is concentrically positioned. For example, the outer hollow cylinder can be configured in a C-shape and form two elastic arms that are spreadable for mounting the inner cylinder or hollow cylinder. According to an alternative embodiment, one joint member can be configured as a ball gripper and the other joint member as a ball segment. A joint can compensate out differences in the relative position between actuating element and slide and to permit larger tolerances.

The slide for example has a contact surface that in the locking position is in contact with a surface of the support post and is positioned relative to the first holding means such that the first holding means when in the locking position is moveable into the notch only to the extent short of contact with a notch floor. The contact surface is for example formed by a bump on the slide.

BRIEF DESCRIPTION OF THE INVENTION

Further advantages of the present invention result on the basis of an illustrated embodiment illustrated in the figures. In the following, schematic figures are described.

FIG. 1a is a perspective front view of a headrest, rigidly attached sockets for holding the support posts not being shown;

FIG. 2b is a perspective transverse section through the headrest according to FIG. 2a;

FIG. 3 is a large-scale view of the detail indicated at III in FIG. 2a;

FIG. 4a is a sectional side view of the base taken in the direction of arrow IVa in FIG. 2a;

FIG. 4b is a perspective view of the detail of FIG. 4a;

FIG. 6 is a section taken along section line VI-VI in FIG. 7a;

FIG. 9 is a perspective rear view of the headrest, the cushion not being shown;

FIG. 10b is a perspective view of the detail according to FIG. 10a; and

SPECIFIC DESCRIPTION OF THE INVENTION

Figure 1B:
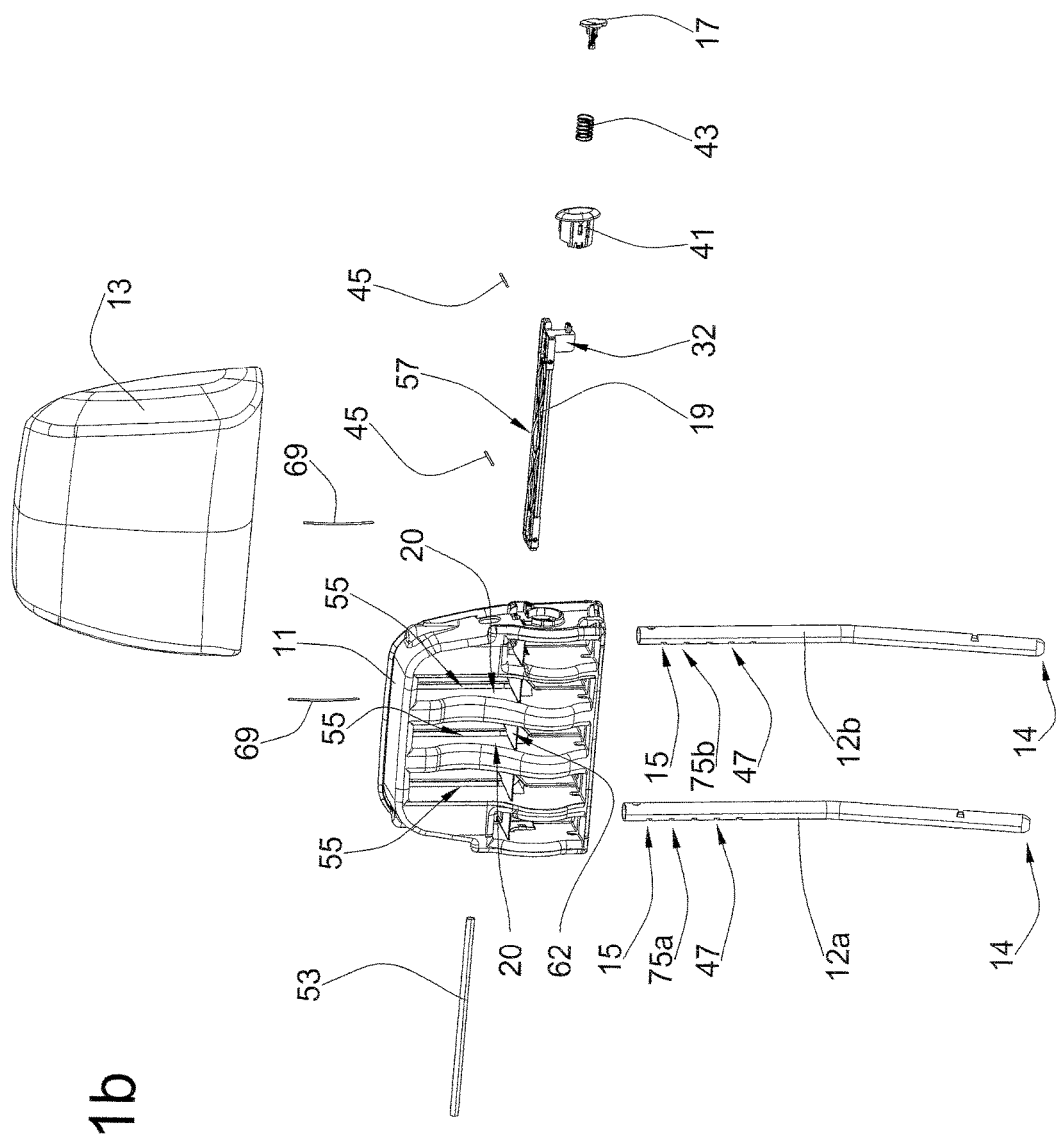
FIG. 1b is an exploded view of the headrest.

In all figures, the headrest is indicated at reference character 10. The same reference characters in the different figures denote respective parts, even if lower-case letters are added or omitted.

From FIG. 1a is a perspective view of a base 11 of headrest 10. The headrest 10 comprises support posts 12a and 12b on which a base is mounted. The base 11 is provided with a cushion 13. Lower ends 14 of the support posts 12a and 12b are fixed in unillustrated sockets of a vehicle seat. An upper end 15 (see FIG. 1b) of each support post 12a and 12b is accommodated in a respective bearing of the base 11.

The base 11 is adjustable relative to the support posts 12a and 12b in directions $z_1$ and $z_2$. A latch 16 adjustable between a locking position and a release position can lock the base 11 at different height positions. The latch 16 has an actuating element 17 in the form of a push button that is operable from outside of the base 11. The base 11 forms a head contact surface 18 for resting or abutting the head of an unillustrated seat occupant.

FIG. 1b is an exploded view of the headrest 10 showing individual parts of the headrest 10.

Figure 1C:
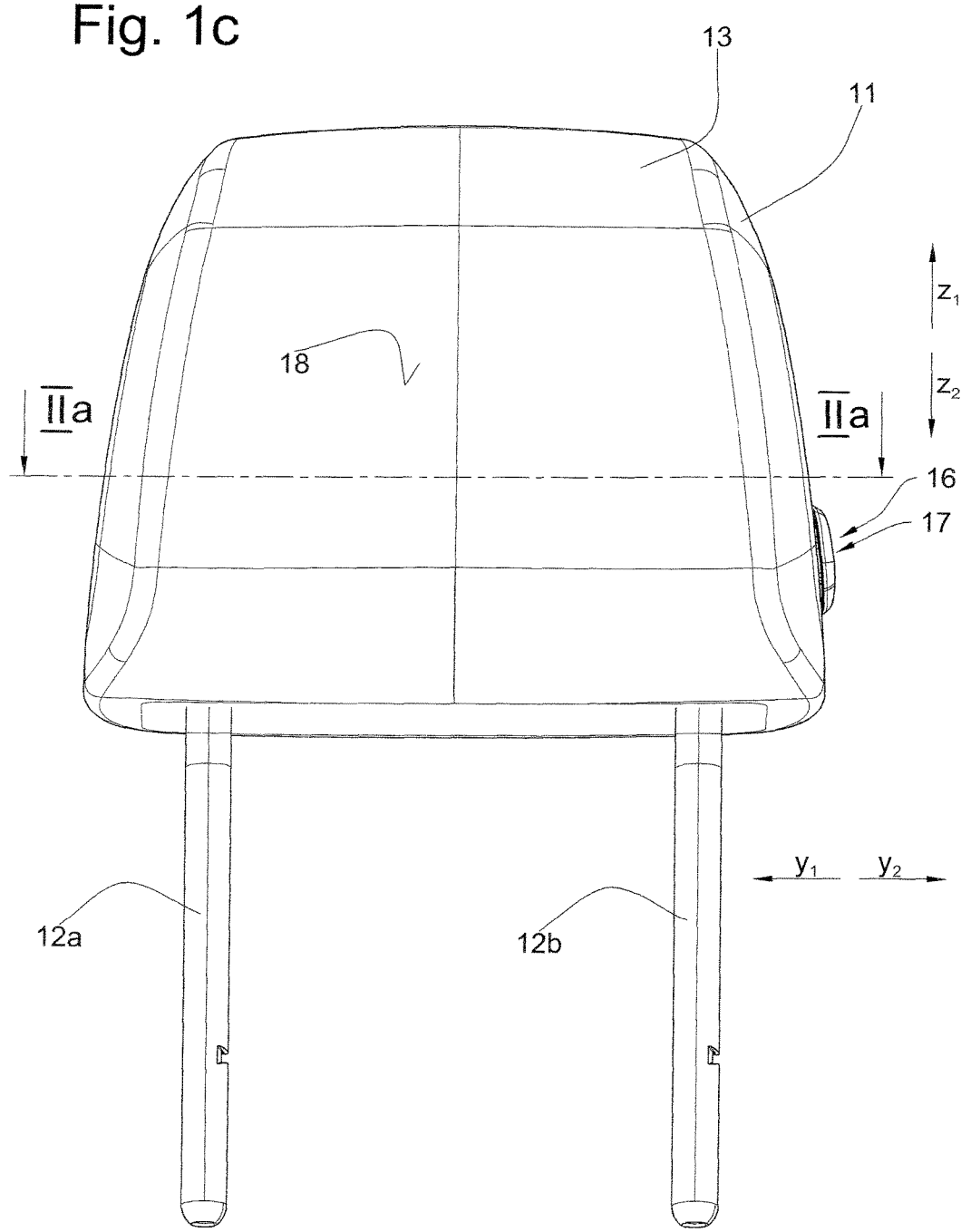
FIG. 1c is a front view of the headrest according to FIG. 1a with the latch in the locking position.

FIG. 1c is a front view of the headrest 10. In this illustrated embodiment, the actuating element 17 for operating the latch 16 is on the left side of the base 11 because the headrest is for the driver seat. According to another shown embodiment, for a headrest for the passenger seat, the actuating element can be on the right side of the base 11.

Figure 2A:
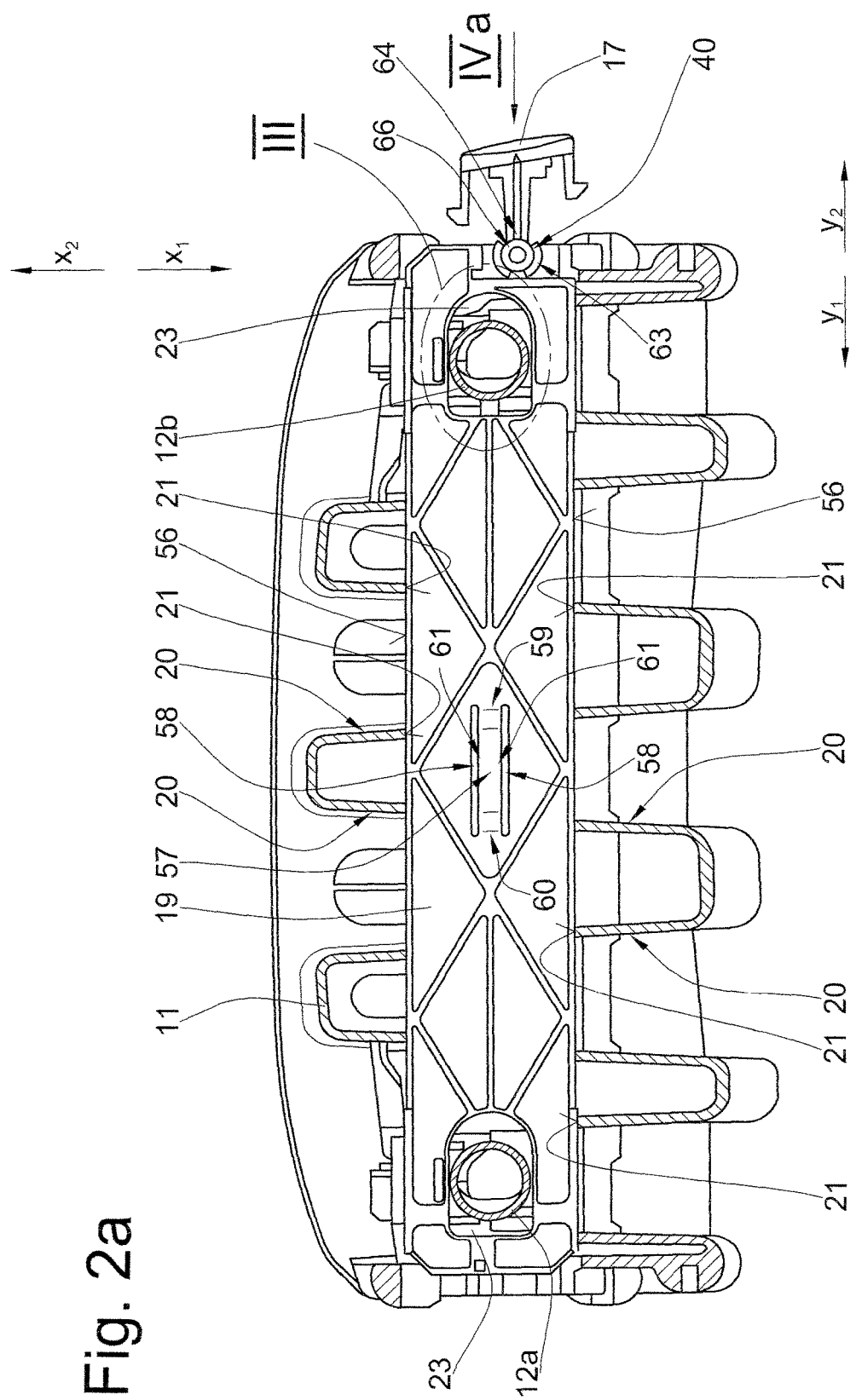
FIG. 2a is a section taken along section line IIa-IIa in FIG. 1c.

FIG. 2a is a section through the base 11. The cushion 13 is not shown. A slide 19 of the latch 16 is guided by ribs 20 of the base 11 to move between the locking position shown in FIGS. 2a and b and an unillustrated release position of the latch 16 in directions $y_1$ and $y_2$. The slide 19 is urged in the direction $y_2$ into the locking position, in particular by a spring. The actuating element 17 can push the slide 19 in the direction $y_1$ into the release position.

The ribs 20 are cut out such that a guide groove 22 is formed. Guide surfaces 21 of the base 11 are turned toward the guide groove 22 and act together with outer surfaces 56 of the slide 19. The slide 19 is positioned in the guide groove 22 such that it is substantially not movable in directions $x_1$ and $x_2$ or in directions $z_1$ and $z_2$ (that is, it is only movable in one direction) while it is movable in directions $y_1$ and $y_2$.

To compensate for play in directions $z_1$ and $z_2$, the slide 19 has a spring web 57 that is formed by a part of the slide 19 pushed out in the direction $z_1$. The pushed-out part is between two slots 58 so that the pushed-out part forms a web that is connected to the slide at ends 59 and 60. Its side edges 61 are separated from the slide 19 by the slots 58 so that the spring web 57 can elastically deform in the direction $z_2$ opposite its spring elastic return force. The spring web 57 is in contact with a part 28 of an upper wall 62 limiting the guide groove 22 (see FIGS. 1b and 9). The spring web 57 urges the slide 19 in the direction $z_2$ against a lower guide surface of the guide groove 22.

According to FIG. 2a, the slide 19 has two slot-shaped holes 23. The support post 12a engages through one of holes 23, and the support post 12b engages through the other hole 23.

Figure 3:
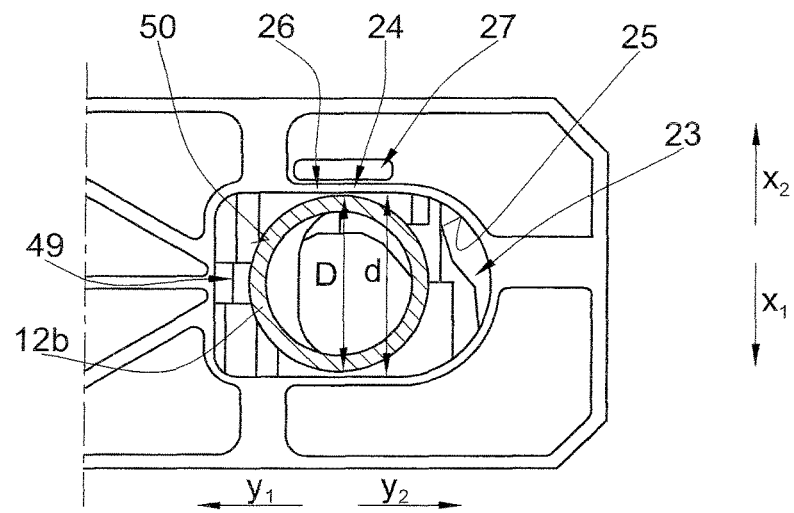

FIG. 3 shows an enlarged view of a detail of FIG. 2a. An outside diameter D of the support post 12b is slightly bigger than the inside diameter d of the hole 23. An area 24 of an outer surface 25 of the hole 23 is part of a web 26 that is formed in the slide 19 between outer surface 25 and a hole 27. The web 26 is elastically deformable and can elastically deform into the hole 27. In this manner, the slide 19 fits, despite shape and position deviations of the base 11 and/or of the slide 19 and/or of the support posts 12a and 12b owing to dimensional tolerances, always free of play in the directions $x_1$ and $x_2$ on the support post 12b.

Figure 4A:
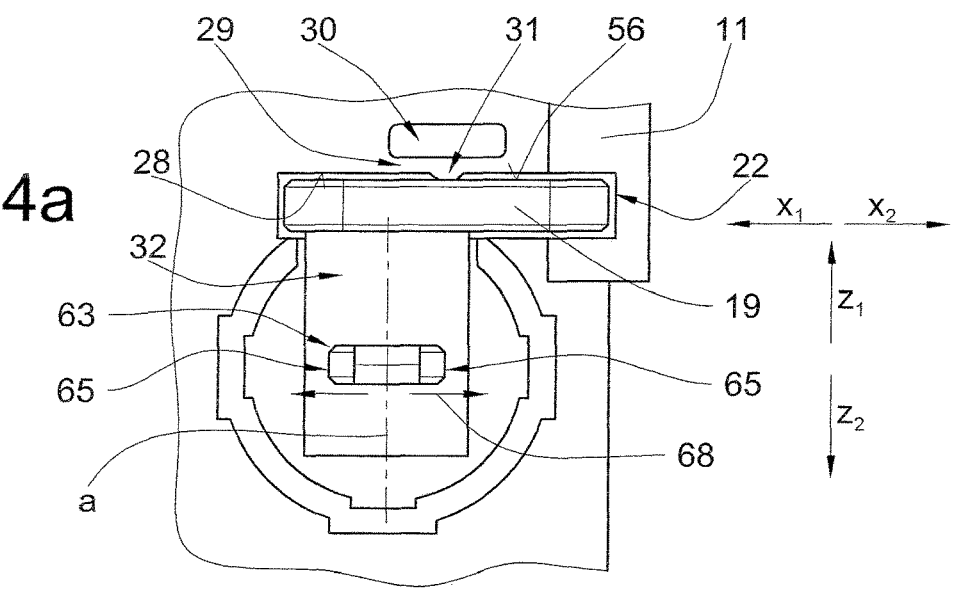
Figure 4B:
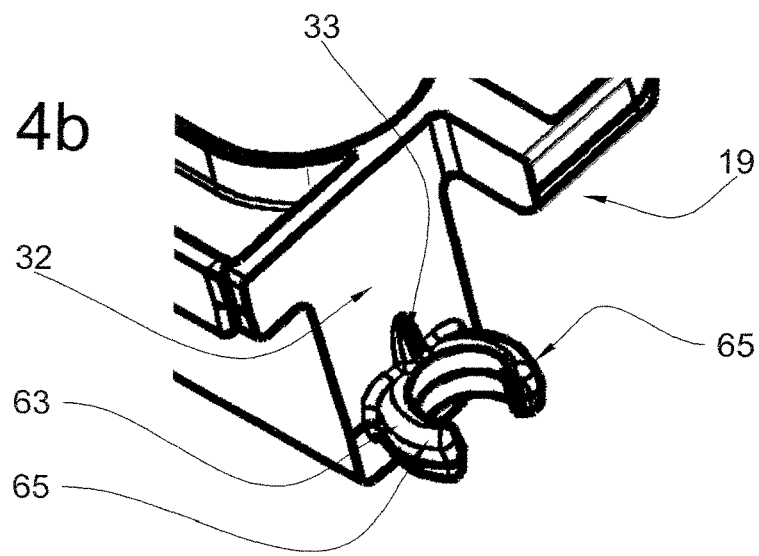

FIGS. 4a and 4b show that an area of an outer surface 28 of the base 11 facing the guide groove 22 is part of an elastically deformable web 29. The web 29 is formed by a hole 30 adjacent the outer surface 28. The web 29 is provided with a bump 31 that projects into the guide groove 22 and abuts the outer surface 56 of the slide 19. In this manner, the slide 19 fits, despite manufacturing dimensional tolerances of the base 11 and the slide 19, free of play in the guide groove 22 with regard to directions $z_1$ and $z_2$.

An extension 32 of the slide 19 projects downward from the slide 19 in the direction $z_2$, and a projection 33 extending in the direction $y_2$ adjacent a hollow C-shaped claw 63 whose center axis a is perpendicular to the x/y plane. The C-shaped claw 63 has an aperture 64 and arms 65 that are elastically spreadable as shown by arrows 68.

Figure 5:
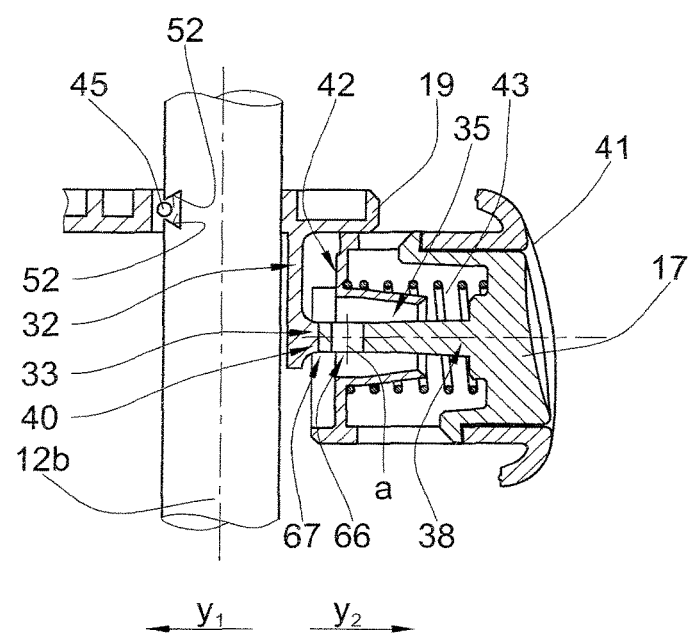
FIG. 5 is a section through an element for actuating the slide.

According to FIG. 5, the actuating element 17 is movably guided in a housing 41 in directions $y_1$ and $y_2$. The housing 41 has a floor 42 against which one end of a spring 43 is braced. The other end of the spring 43N bears against the actuating element 17 and urges it and for this reason also the slide 19 in the direction $y_2$ into the locking position.

The actuating element 17 has an extension 38 whose free end is shaped as a cylindrical segment 66. This cylindrical segment 66 is engaged in the C-shaped claw 63 and forms together with it a joint 67. Limited movement in directions $x_1$ and $x_2$ and in the directions $z_1$ and $z_2$ is possible between the cylindrical segment 66 and the C-shaped claw 63. In this manner, dimensional deviations based on shape and position tolerances between the position of the slide 19 and the position of the actuating element 17 can be compensated out.

Figure 10A:
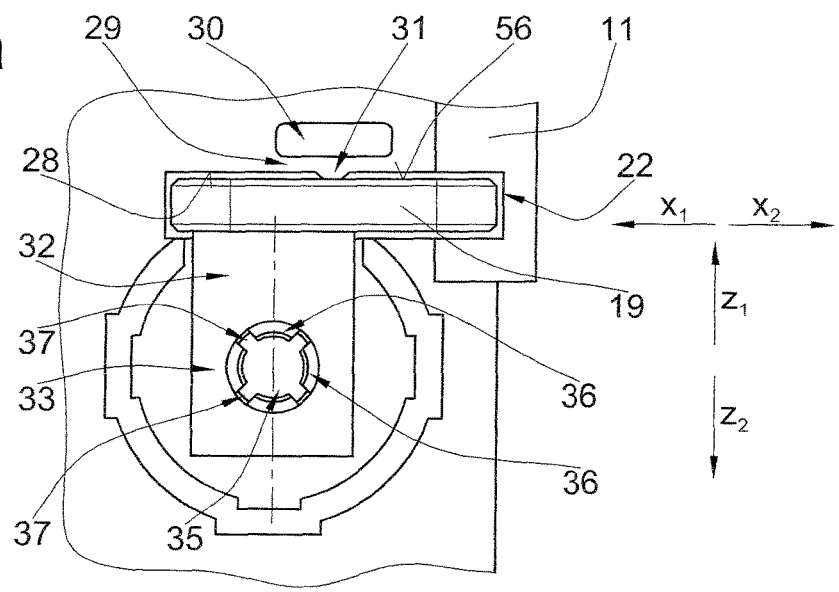
FIG. 10a shows, like FIG. 4a, a side-view detail of a second embodiment of the headrest.
Figure 10B:
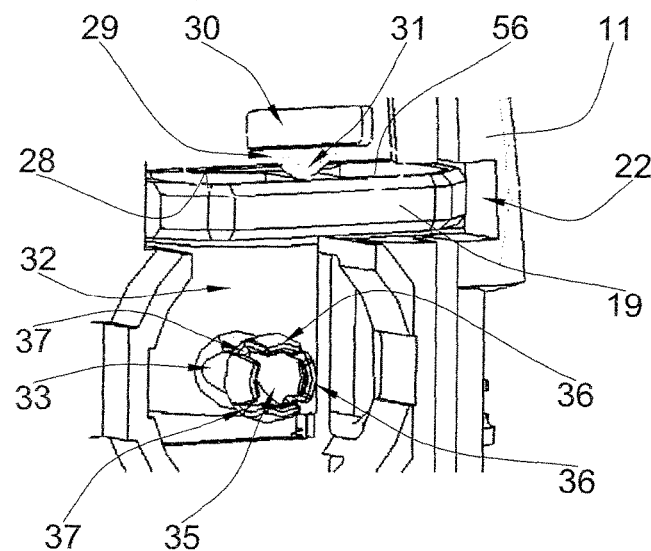
Figure 10C:
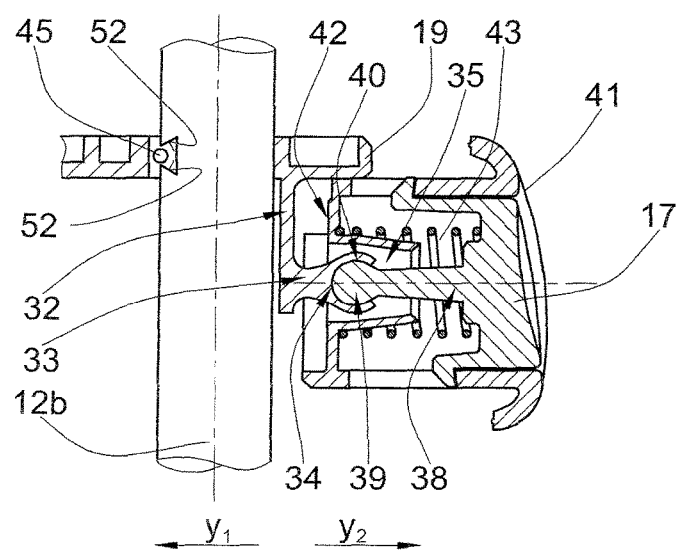
FIG. 10c shows, like FIG. 5, a section through the second embodiment.

According to an alternative embodiment (see FIGS. 10a through 10c), a ball gripper 34 having a cavity can be formed on the extension 33. At a free end, ball gripper 34 is provided with a socket 35. The areas of ball gripper 34 adjacent the socket 35 have elastically deformable arms 36 between which slots 37 are formed. The arms 36 are radially elastically deformable so that the socket is enlargeable by elastic deformation of the arms 36.

In this case, the free end of extension 38 of the actuating element 17 is shaped as a ball segment 39. This ball segment 39 fits in the ball gripper 34 and forms together with it a ball joint 40. The ball joint 40 can compensate out dimensional deviations owing to shape and position tolerances in directions $x_1$ and $x_2$ and/or $z_1$ and $z_2$ between the position of the slide 19 and the position of the actuating element 17.

Figure 6:
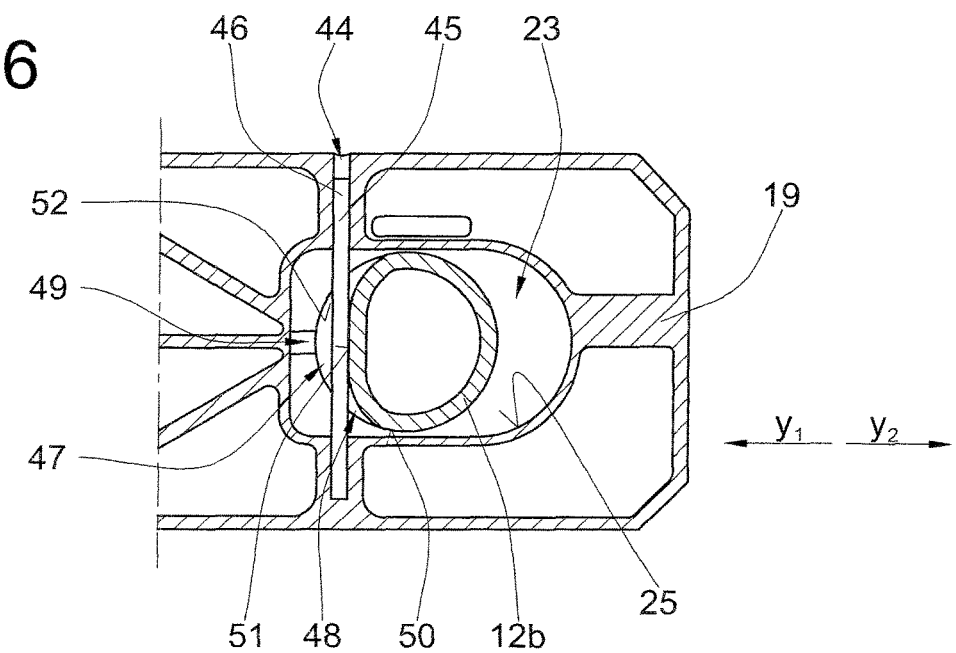
Figure 7A:
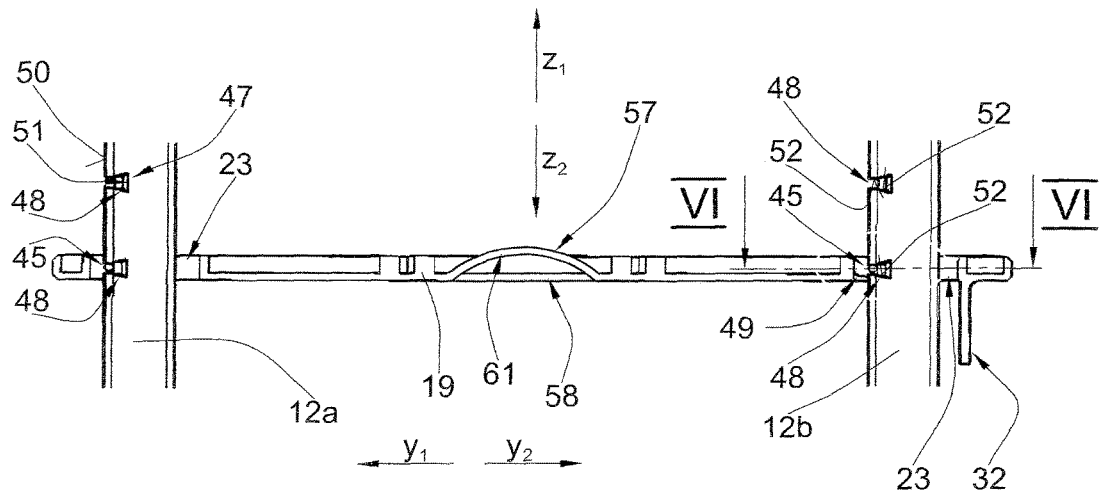
FIG. 7a is a front view of the slide and of the support posts of the headrest in the locking position of the latch.
Figure 7B:
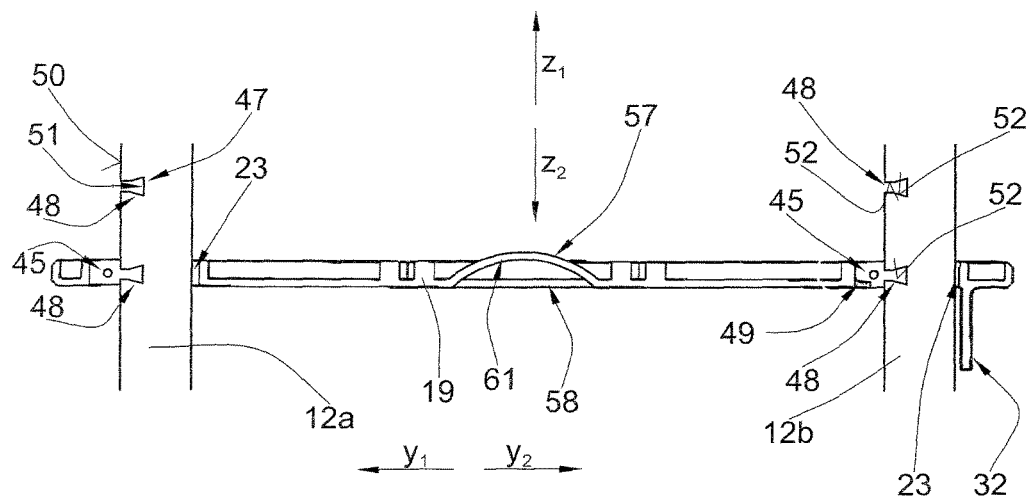
FIG. 7b is a view like FIG. 7a, but in the release position of the latch.
Figure 8:
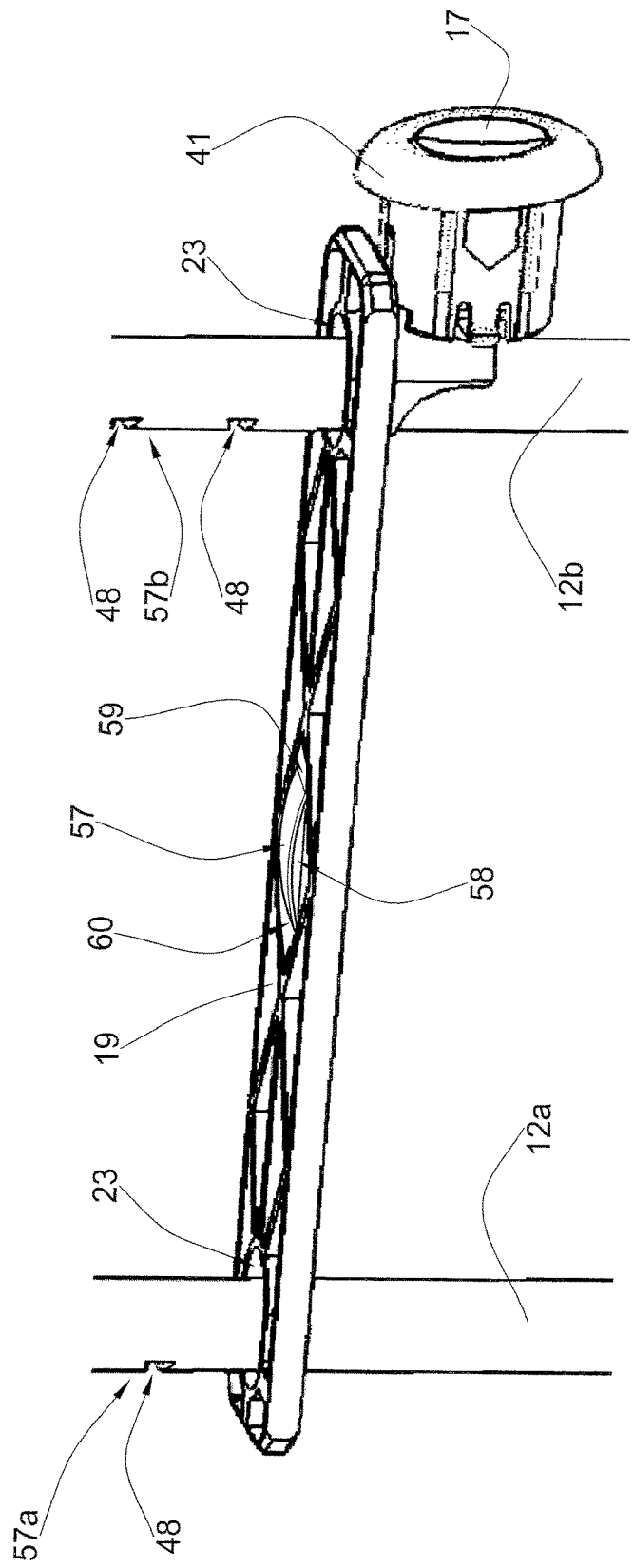
FIG. 8 is a perspective view of the slide, the support posts and the actuating element.

The bores 44 of the slide 19 hold first holding means 46 in the form of locking pins 45 transversely movable in the directions $y_1$ and $y_2$ of the slide 19 (see for example FIGS. 6 and 7). The bores 44 are configured complementarily to the outer surface of the cylindrical locking pin 45 so that no relative movement between the locking pins 45 and the slide 19 can occur in directions $y_1$ and $y_2$ and $z_1$ and $z_2$. The fit of the locking pin 45 is selected such that the locking pin 45 cannot inadvertently move out of the bore 44. Forces acting upon the base 11 can be transferred by the locking pin 45 of the slide 19 to the support post 12a or 12b.

According to FIG. 1b, the support post 12a has an array 75a and the support post 12b has an array 75b of holding means 47 that are formed by notches 48. The two locking pins 45 of the slide 19 are in the locking position of the slide 19 in engagement with a respective one of the notches 48 (see for example FIG. 7a). In the release position according to FIG. 7b, the locking pins 45 are not in engagement with the notches 48. FIG. 6 shows that from the outer surface 25 of the hole 23 a bump 49 projects in the direction $y_2$ into the hole 23. The bump 49 is formed in only one of holes 23. This bump 49 is oriented relative to the respective locking pin 45 such that it abuts in the locking position against a surface 50 of the support post 12b and prevents the slide 19 from moving so far in the direction $y_2$ that the locking pin 45 comes into contact with the notch floor 51. Thus, the bump 49 eliminates a noise on locking of the pin 45.

Despite the contact of the bump 49 with the surface 50, the locking pin 45 in the locking position is positioned in the notch such that the locking pin 45 is in contact with at least one latch face 52 that prevents a movement of the base 11 in direction(s) $z_1$ and/or in the direction $z_2$.

In this illustrated embodiment, each notch 48 is provided with two opposite latch faces 52, as a result of which a movement of the base 11 in directions $z_1$ and $z_2$ is prevented. According to an alternative unillustrated embodiment, the notches can also only have one latch face 52 and, for this purpose, have an inclined flank, the slide 19 being moved in the direction $y_1$ into the release position by the locking pin 45 in contact with the inclined plane of the slide 19. In this case, only a movement in the direction $z_2$ would be blocked in the locking position; however, a movement in the direction $z_1$ would be possible.

FIG. 9 shows a perspective view of the base 11 from behind. For mounting the base 11 on the support posts 12a and 12b, guide sleeves 76a and 76b are molded in the base 11. The support post 12a is received in the guide sleeve 76a and the support post 12b is received in the guide sleeve 76b. The guide sleeves 76a and 76b allow the base 11 to slide on the support posts 12a and 12b in directions $z_1$ and $z_2$. A spring 69a is part of the guide sleeve 76a and a spring 69b is part of the guide sleeve 76b. Each spring 69a and 69b is attached with a respective bracket 70 to the base 11.

The spring 69a has a free upper end 71 and a free lower end 72. The upper free end 71 is in contact with a guide element 73 and urges the same in the direction $x_1$ against the support post 12a. Free lower end 72 acts together with a guide element 74 and urges it in the direction $x_1$ against the support post 12a. In a similar manner, the spring 69b acts together with guide elements 73 and 74 and urges them in the direction $x_1$ against the support post 12b. The guide elements 73 and 74 are held on the base 11 and are movably configured such that they can be moved when in contact with the support posts 12a and 12b. The springs 69a and 69b urge the base 11 in the direction $x_2$ such that the support posts 12a and 12b are kept in contact with an inner wall of respective guide sleeve 76a or 76b.

Figure 2B:
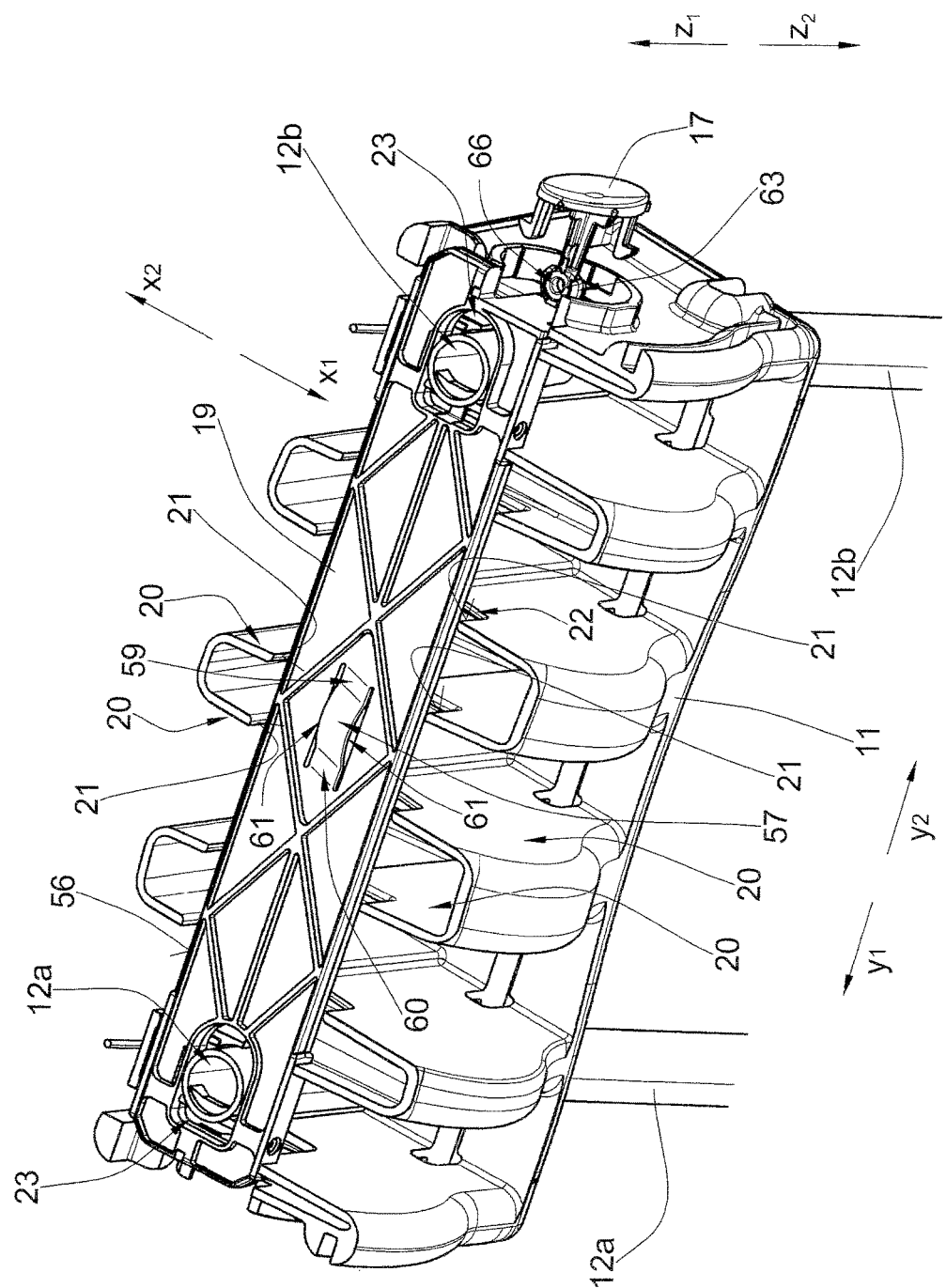

In the following, mounting the headrest 10 is described (see FIG. 2).

After mounting the locking pins 45 in the respective bores 44, the slide 19 is inserted in the direction $y_1$ into the guide groove 22 of the base 11. Subsequently, the support posts 12a and 12b are inserted into the guide sleeves 76a and 76b of the base 11 so that they engage through the holes 23 of the slide 19. Finally, a traverse 53 is guided through apertures and slots 55 of base 13 and the ends of the traverse 53 are fastened on upper ends 15 of the support posts 12a and 12b. The fastener can be formed for example by a welded connection, a wobble riveting connection or other conventional connections.

Subsequently, the cushion 13 is mounted on the base 11. The housing 41, the spring 43 and the actuating element 17 are pre-mounted and are attached to the base 11 as a component group in that the cylindrical segment 66 is interlocked with the C-shaped claw 63. For this purpose, the cylindrical segment 66 is moved through aperture 64 to engage with the C-shaped claw 63 so as to spread the arms 65 as indicated by arrow pair 68. If the cylindrical segment 66 is in its seat, the arms 36 engage behind the cylindrical segment 66. Between the cylindrical segment 66 and the C-shaped claw 63 a joint 67 is formed that enables the actuating element 17 with reference to its intended position to be situated minimally offset in the direction $z_1$ or $z_2$ and/or in the direction $x_1$ or $x_2$ relative to the slide.

The function of the headrest 10 is described below. According to FIG. 9, the base 11 is in the lowest position. The traverse 53 is in an upper region 54 from which slots 55 are formed into the ribs 20 of the base 11. If the base 11 is to be moved upward from the lowest position, first, the latch 16 is to be adjusted from the locking position into a release position by pressure on the actuating element 17.

In the locking position, the slide 19 is in the position as shown for example in FIG. 7. The locking pins 45 are engaged with the notches 48 so that movement of the base 11 in directions $z_1$ and $z_2$ is prevented by opposite latch faces 52 of the notches 48.

On actuation, the element 17 moves opposite to the force of the spring 43 in the direction $y_1$. The slide 19 is also moved via the joint 67 in the direction $y_1$ into the release position. In the release position (see FIG. 7b) the slide 19 is, with reference to the shown position in FIG. 7, moved in the direction $y_1$ and the locking pins 45 are out of engagement with the notches 48. The base 11 can now be moved in the direction $z_2$.

As soon as the desired vertical position is attained, the pressure onto the actuating element 17 can be released. The actuating element 17 is then moved by the spring 43 in the direction $y_2$, the slide 19 also being moved in the direction $y_2$. For this purpose, the locking pins 45 are, depending on the height position of the base 11, engaged with the notches 48 against the surface 50 of the support post 12a or 12b and lock in one of the notches 48. The latch 16 is then again in the locking position. In the locking position, the bump 49 abuts a the surface 50 of the support post 12b and prevents the locking pin 45 from moving when in contact with notch floor 51 (see FIGS. 3 and 6). In the locking position, a gap is formed between locking pin 45 and notch floor 51.

What is claimed is:

1. A headrest for a vehicle seat, the headrest comprising:
a support post;
a base mounted by the support post on the seat and displaceable relative to the support post;
a slide movable in a direction on the base;
a latch moveable between a locking position and a release position and capable of locking the base in at least one position relative to the support post, the latch having a first holding formation formed on the slide and a second holding formation on the support post, the first holding formation being moveably mounted with the slide on the base such that the first holding formation and the second holding formation are in engagement in the locking position and are disengaged in the release position;
an actuating element movable on the base parallel to the direction; and
a pivot joint to compensate for misalignment of the actuating element and slide relative to the direction and having a slide mounting member on the slide and a mounting member on the actuating element fitting with the slide member to couple the actuating element with the slide and move the latch between the locking and release positions on movement of the actuating element in the direction, at least one of the members being elastically deformable.

2. The headrest according to claim 1, wherein the slide forms a guide with the base or the support post in at least one direction.

3. The headrest according to claim 2, wherein the guide forms between the slide and the support post or between the slide and the base a tight fit.

4. The headrest according to claim 3, wherein the slide forms at least one first guide surface that is in contact with at least one second guide surface of the base or the support post and that forms a guide.

5. The headrest according to claim 4, wherein the first guide surface or the second guide surface forms at least one bump that is facing the other guide surface.

6. The headrest according to claim 1, wherein the slide engages at least partially around the support post.

7. The headrest according to claim 1, wherein the base has a guide groove in which the slide is moveable between the locking position and the release position.

8. The headrest according to claim 1, wherein the slide has a contact surface that in the locking position is in contact with a surface of the support post and is positioned relative to the first holding formation such that the first holding formation is not in contact with a notch floor.

9. The headrest according to claim 1, wherein the pivot joint is a hinge or ball joint.

10. The headrest according to claim 1, wherein one of the mounting members is an arm formed at an end with a socket and the other of the members is an arm formed at an end with a head engaged elastically in the claw.

11. The headrest according to claim 10, wherein at least one of the arms extends at least partially in the direction and is elastically deformable transverse to the direction to allow transverse deflection of the ball and claw and thereby compensate for misalignment of the slide and actuating member.

12. The headrest according to claim 1, wherein the head is a ball and the socket is a complementary claw.

13. The headrest according to claim 1, wherein the head is a cylinder and the socket is complementary thereto.

14. A headrest for a vehicle seat, the headrest comprising:
a support post;
a base mounted by the support post on the seat and displaceable relative to the support post, the base forming a base guide surface;
a slide movable on the base and forming a slide guide surface engaging the base guide surface in a tight fit in at least one direction; and
a latch moveable between a locking position and a release position and capable of locking the base in at least one position relative to the support post, the latch having a first holding formation fixed on the slide and a second holding formation on the support post, the first holding formation being movable with the slide on the base such that the first holding formation and the second holding formation are in engagement in the locking position and are disengaged from each other in the release position, one of the base and slide guide surfaces being formed at least partly by a web that is deformable into an adjacently formed hole forming the other guide surface.

* * * * *